US009235840B2

(12) United States Patent
Syed et al.

(10) Patent No.: US 9,235,840 B2
(45) Date of Patent: Jan. 12, 2016

(54) ELECTRONIC TRANSACTION NOTIFICATION SYSTEM AND METHOD

(75) Inventors: Farman Syed, San Jose, CA (US); Daniel Emil Pu, San Francisco, CA (US); Darci Groves, San Jose, CA (US); David Ralston, San Jose, CA (US); Thomas K. Burkholder, Vancouver (CA); Roozbeh Ghaffari, Vancouver (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/471,297

(22) Filed: May 14, 2012

(65) Prior Publication Data

US 2013/0305335 A1 Nov. 14, 2013

(51) Int. Cl.
| G06F 21/00 | (2013.01) |
| G06F 7/04 | (2006.01) |
| G06Q 20/40 | (2012.01) |
| G06Q 20/42 | (2012.01) |

(52) U.S. Cl.
CPC ............ *G06Q 20/4016* (2013.01); *G06Q 20/40* (2013.01); *G06Q 20/425* (2013.01)

(58) Field of Classification Search
CPC ........... G06F 7/04; G06F 15/16; G06F 17/30; G06F 21/00; G06F 20/20; G06F 20/40; H04L 29/06; G06Q 20/4016; G06Q 20/425
See application file for complete search history.

(56) References Cited

U.S. PATENT DOCUMENTS

| 6,064,990 | A | * | 5/2000 | Goldsmith ...................... 705/75 |
| 7,908,645 | B2 | | 3/2011 | Varghese et al. |
| 8,161,174 | B1 | * | 4/2012 | Sankaranaraynan et al. . 709/229 |
| 8,443,202 | B2 | * | 5/2013 | White et al. ................... 713/186 |
| 2002/0035607 | A1 | | 3/2002 | Checkoway et al. |
| 2002/0156688 | A1 | * | 10/2002 | Horn et al. ...................... 705/26 |

(Continued)

FOREIGN PATENT DOCUMENTS

| EP | 1662829 A1 * | 5/2006 | |
| WO | 2010/150229 | 12/2010 | |
| ZA | WO 2010150229 A2 * | 12/2010 | ............. G06Q 20/12 |

OTHER PUBLICATIONS

IBM, "Method for optimizing performance in a secured transaction session", IPCOM000133038, Jan. 11, 2006, 3 pages.*

(Continued)

*Primary Examiner* — Andrew Nalven
*Assistant Examiner* — Walter Malinowski
(74) *Attorney, Agent, or Firm* — Novak Druce Connolly Bove + Quigg LLP

(57) ABSTRACT

Systems and method are provided for delivering notifications to user regarding use of their authentication information. The delivery of notifications involves ascertaining a device identifier associated with a request received from a user device to engage in a transaction using the authentication information and comparing this device identifier associated with the request to a plurality of known device identifiers previously associated with the authentication information. Thereafter, a notification for a user associated with the authentication information can be generated and delivered, if the device identifier is not among the plurality of known device identifiers. In the systems and methods, contact information for delivering the notification is based on contact information for at least one previous transaction that meets a selection criteria and that is associated with the authentication information.

15 Claims, 4 Drawing Sheets

(56) References Cited

U.S. PATENT DOCUMENTS

| | | | |
|---|---|---|---|
| 2003/0110272 A1* | 6/2003 | du Castel et al. | 709/229 |
| 2005/0097046 A1* | 5/2005 | Singfield | 705/42 |
| 2005/0133588 A1* | 6/2005 | Williams | 235/379 |
| 2007/0061871 A1 | 3/2007 | Simpkins et al. | |
| 2007/0198410 A1* | 8/2007 | Labgold et al. | 705/44 |
| 2007/0258108 A1* | 11/2007 | Matsumoto et al. | 358/1.15 |
| 2008/0122656 A1* | 5/2008 | Carani et al. | 340/995.28 |
| 2008/0167990 A1* | 7/2008 | Grant | G06Q 20/102 705/44 |
| 2008/0183630 A1* | 7/2008 | Stephenson | 705/75 |
| 2008/0220775 A1* | 9/2008 | Tischer et al. | 455/435.1 |
| 2008/0226142 A1 | 9/2008 | Pennella et al. | |
| 2008/0284566 A1* | 11/2008 | Zai et al. | 340/7.56 |
| 2008/0301055 A1* | 12/2008 | Borgs et al. | 705/64 |
| 2009/0016504 A1* | 1/2009 | Mantell et al. | 379/101.01 |
| 2009/0081991 A1* | 3/2009 | Titus et al. | 455/408 |
| 2009/0106149 A1* | 4/2009 | Bennett | G06Q 20/10 705/42 |
| 2009/0269063 A1* | 10/2009 | Bernard et al. | 398/66 |
| 2009/0274158 A1* | 11/2009 | Sharp et al. | 370/400 |
| 2009/0288039 A1* | 11/2009 | Mail et al. | 715/815 |
| 2010/0153451 A1* | 6/2010 | Delia et al. | 707/781 |
| 2010/0209006 A1* | 8/2010 | Grigsby et al. | 382/218 |
| 2010/0257580 A1* | 10/2010 | Zhao | 726/1 |
| 2010/0274572 A1* | 10/2010 | Hammad et al. | 705/1.1 |
| 2010/0293094 A1* | 11/2010 | Kolkowitz | G06Q 20/40 705/44 |
| 2011/0022483 A1* | 1/2011 | Hammad | 705/17 |
| 2011/0055058 A1* | 3/2011 | Hammad | G06Q 30/06 705/30 |
| 2011/0055216 A1* | 3/2011 | Weinroth | 707/740 |
| 2011/0161791 A1* | 6/2011 | Travis et al. | 715/205 |
| 2011/0238564 A1* | 9/2011 | Lim et al. | 705/38 |
| 2011/0307381 A1* | 12/2011 | Kim | G06Q 20/027 705/44 |
| 2012/0046985 A1* | 2/2012 | Richter et al. | 705/7.14 |
| 2012/0079578 A1* | 3/2012 | Dachiraju et al. | 726/7 |
| 2012/0094639 A1* | 4/2012 | Carlson et al. | 455/414.1 |
| 2012/0102409 A1* | 4/2012 | Fan et al. | 715/738 |
| 2012/0150750 A1* | 6/2012 | Law et al. | 705/76 |
| 2012/0157062 A1* | 6/2012 | Kim et al. | 455/414.1 |
| 2013/0291099 A1* | 10/2013 | Donfried et al. | 726/22 |

OTHER PUBLICATIONS

International Preliminary Report on Patentability from PCT Application No. PCT/US2013/040795 dated Nov. 27, 2014.

International Search Report and Written Opinion from PCT Application No. PCT/US2013/040795 dated Sep. 27, 2013.

* cited by examiner

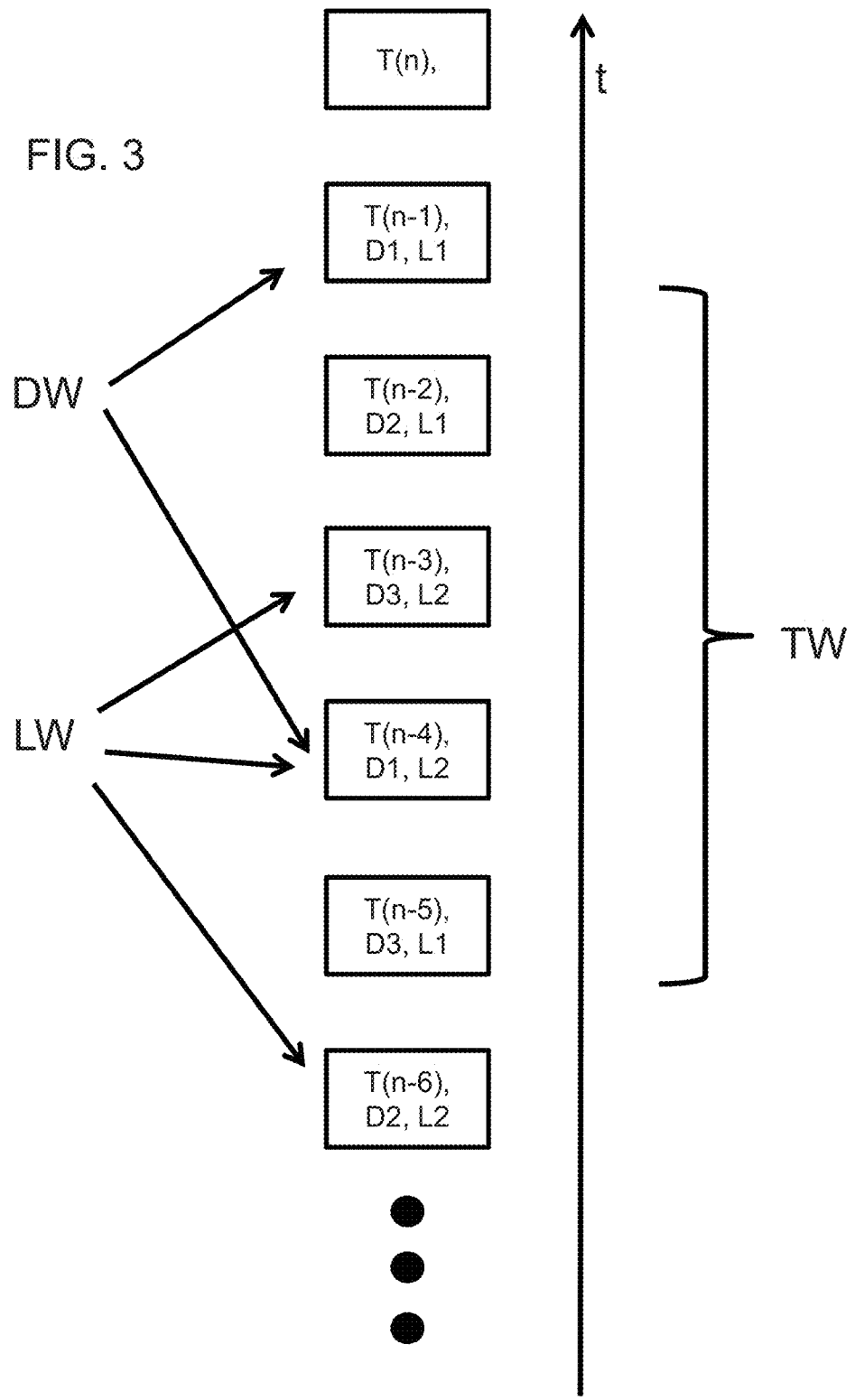

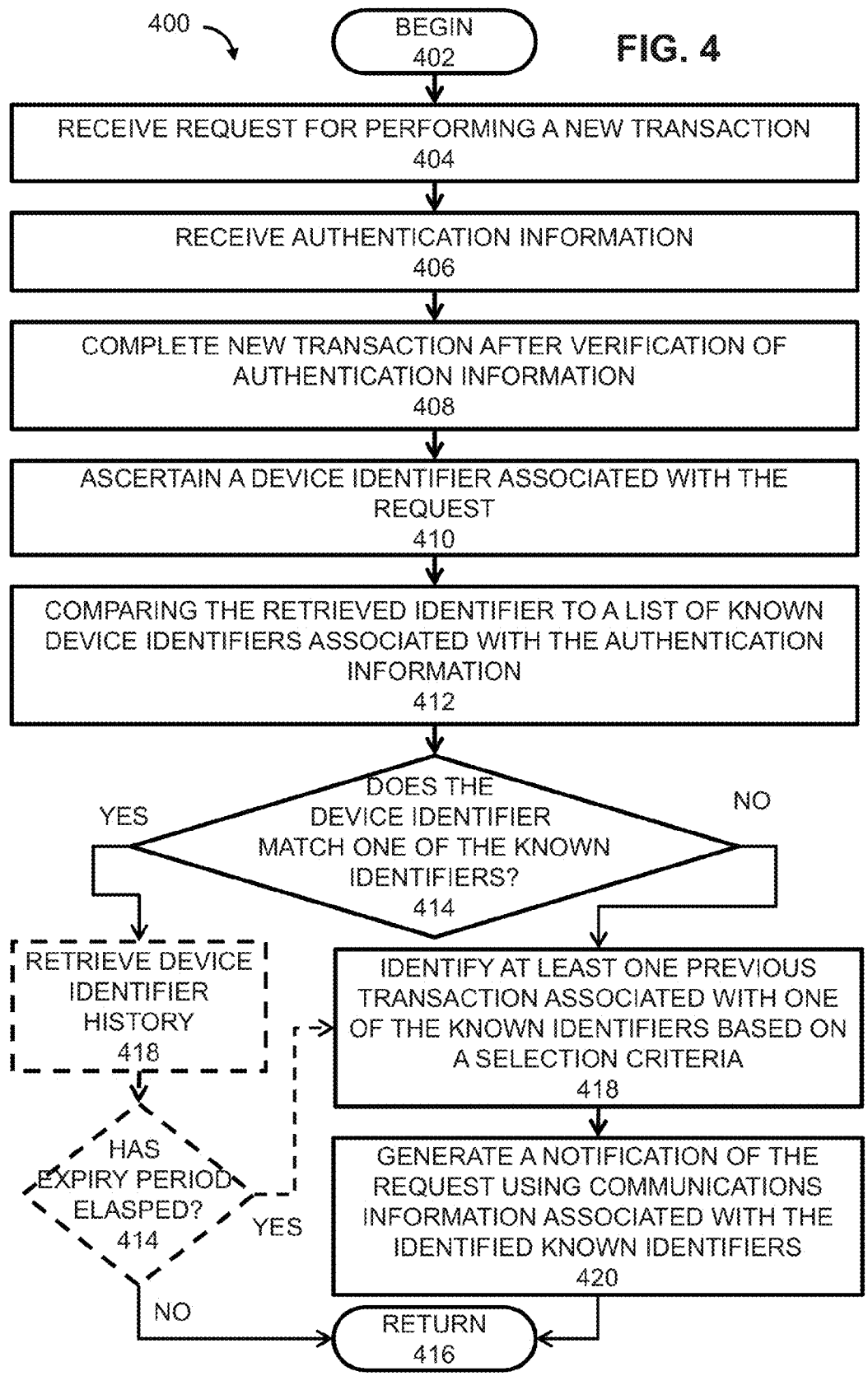

ELECTRONIC TRANSACTION NOTIFICATION SYSTEM AND METHOD

FIELD

The following relates to electronic transactions and more specifically relates to systems and methods for generating notifications in response to electronic transactions.

BACKGROUND

Year after year, the number of electronic transactions performed via computing devices continues to increase. Additionally, the number of computing devices associated with a single user has also continued to increase over time. For example, it is not uncommon for a user to possess a personal computer and at least one of smartphone device or a tablet device. Further, many users utilize these multiple computing devices for performing electronic transactions with a same electronic entity or service. For example, many financial institutions and digital content providers offer access to their system via desktop or mobile devices to perform substantially the same types of electronic transactions. In another example, these devices may access a same storefront for downloading digital content to the various devices. Moreover, there are many instances in which the user may utilize someone else's computing device to perform such electronic transactions.

In general, such devices are allowed to complete transactions with an electronic entity based on verification of a username/password combination. That is, upon accessing a portal of the electronic entity, the user will typically be requested to supply a valid username/password combination to gain access or complete a transaction. Thereafter, the electronic entity's authentication systems can determine whether or not the combination is valid and allow access by the user if the combination is valid.

For some types of electronic entities, there can be additional safeguards implemented to protect the user from fraud or identity theft. In one example, an electronic entity can require the user to generate a user profile during a previous visit and the user can be required to answer additional questions associated with the user profile when performing certain tasks. Successfully answering such questions can result not only in providing user access, but can result in placement of a cookie or other piece of software on the device to "mark" the device as a known or trusted device during a future visit to avoid the need for such questions. Alternatively, the user can also adjust the user profile to specifically add the device to the account associated with the electronic entity to allow the electronic entity's authentication system to automatically recognize the device.

In general, when the above-mentioned authentication is successful, no further action is taken by the electronic entity's authentication systems. Some electronic entities do offer the option of providing an alert when a new device is added to the list of known or trusted devices in a user profile or when there are other changes in a user profile. This generally occurs via the directing of a pre-defined message via contact information retrieved from the user profile. However, this type of notification generally fails to consider how the user has been utilizing the authentication information. Accordingly, in many instances, authentication systems fail to detect fraudulent access by third parties in possession of the user's authentication information. Worst yet, the user may not be notified of such access by these third parties.

SUMMARY

As an alternative or to supplement to existing authentication systems and methods, the present technology provides systems and methods for generating notifications based on past transactions involving user authentication information. Specifically, the present technology involves obtaining, responsive to a request for at a user device to complete a transaction based on authentication information, a device identifier associated with the user device. This device identifier can be a unique identifier and be at least partially unrelated to a network identifier for the user device.

This device identifier can then be compared known device identifiers associated with the authentication information. In the absence of a match, a notification can be generated, where a format and contact information for the notification is based on the format and contact information for transactions meeting some type of selection criteria.

The selection criteria can include, for example, selecting known identifiers associated with particular past transactions. Alternatively, the known identifiers can be those associated with transactions occurring within a pre-defined time window, specific locations. Further, the known identifiers can be those associated with particular type of transactions. In addition to the foregoing, various other selection criteria can applied in order to select transactions for determining the known identifiers.

As noted above, based on the selected transactions, a format of the notifications can be selected. For example, this can include selection of a language based on the identified transactions. As also noted above, the contact information for the notification can also be selected from the transactions. For example, an email, text message, or other messaging address associated with the identified transactions can be used.

BRIEF DESCRIPTION OF THE DRAWINGS

FIG. 3 is a schematic illustration of some exemplary concepts for generating notifications in accordance with the present technology; and FIG. 4 is a flow chart of steps in an exemplary method for generating notifications in accordance with the present technology.

DESCRIPTION

Figure 1:
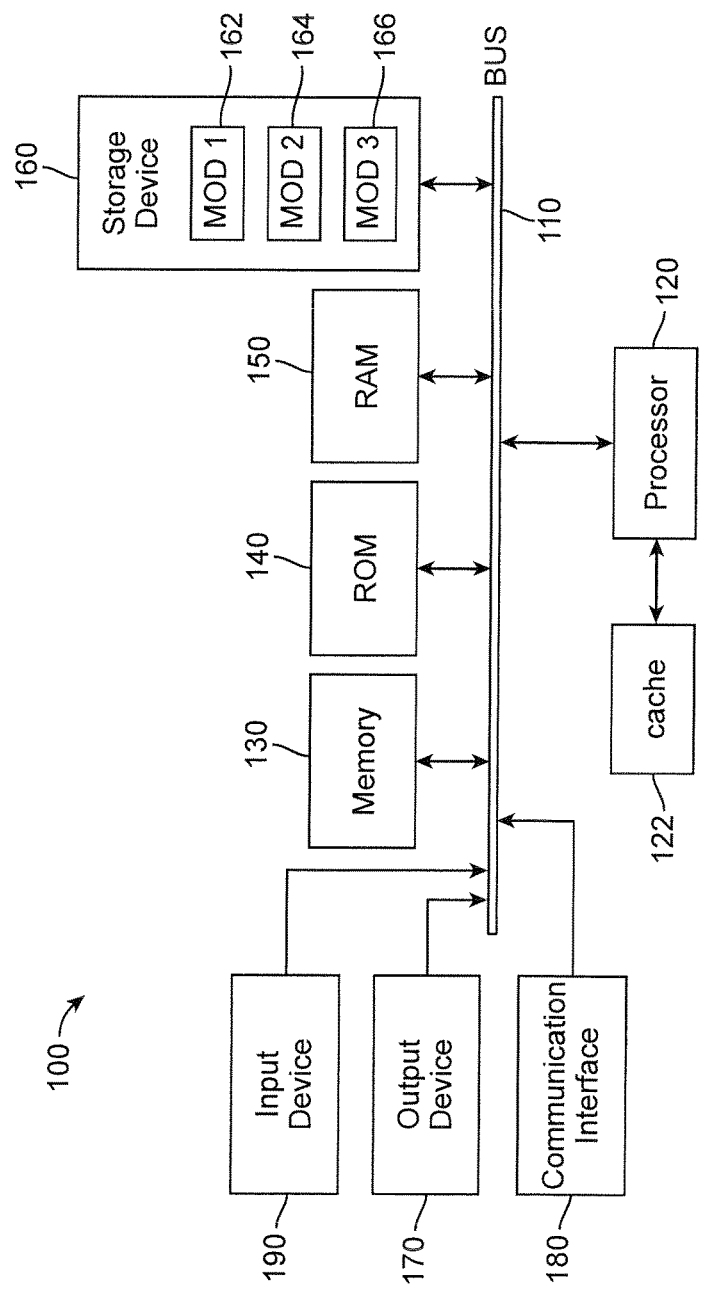
FIG. 1 illustrates an example computing device.

The present technology is described with reference to the attached figures, wherein like reference numerals are used throughout the figures to designate similar or equivalent elements. The figures are not drawn to scale and they are provided merely to illustrate the present technology. Several aspects of the present technology are described below with reference to example applications for illustration. It should be understood that numerous specific details, relationships, and methods are set forth to provide a full understanding of the present technology. One having ordinary skill in the relevant art, however, will readily recognize that the present technology can be practiced without one or more of the specific details or with other methods. In other instances, well-known structures or operations are not shown in detail to avoid obscuring the present technology. The present technology is not limited by the illustrated ordering of acts or events, as some acts may occur in different orders and/or concurrently with other acts or events. Furthermore, not all illustrated acts or events are required to implement a methodology in accordance with the present technology.

FIG. 1 illustrates an exemplary system 100 that includes a general-purpose computing device 100, including a processing unit (CPU or processor) 120 and a system bus 110 that couples various system components including the system memory 130, such as read only memory (ROM) 140, and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs a hard disk as storage device 160, it should be appreciated by those skilled in the art that other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules MOD1 162, MOD2 164 and MOD3 166, which are modules configured to control the processor 120. These modules may be stored on the storage device 160 and loaded into RAM 150 or memory 130 at runtime or may be stored as would be known in the art in other computer-readable memory locations.

Figure 2:
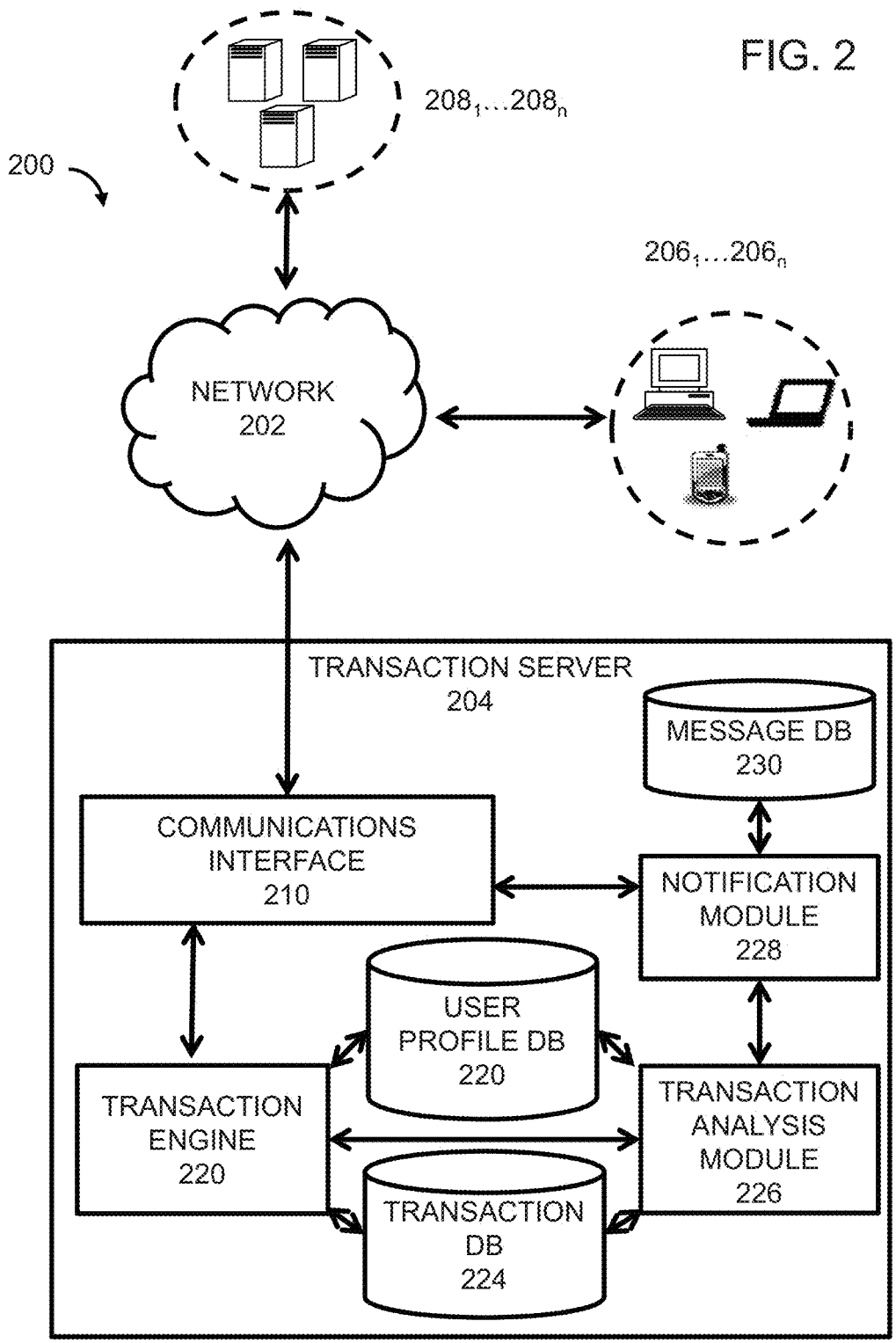
FIG. 2 illustrates an exemplary system configuration, wherein electronic devices communicate via a network for purposes of exchanging content and other data for carryout methods in accordance with the present technology.

Having disclosed some components of a computing system, the disclosure now turns to FIG. 2, which illustrates an exemplary system configuration 200, wherein electronic devices communicate via a network for purposes of exchanging content and other data. The system 200 can be configured for use on a network as that illustrated in FIG. 2. However, the present principles are applicable to a wide variety of network configurations that facilitate the intercommunication of electronic devices. For example, each of the components of system 200 in FIG. 2 can be implemented in a localized or distributed fashion in a network.

System 200 is configured for allowing transactions to be performed between different parties or entities connected to a network 202 by direct and/or indirect communications with transaction server 204. In the present technology, a transaction can occur between different users at user terminals $206_1 \ldots 206_n$ (collectively "206"), between different entities associated with entity systems or entity servers $208_1 \ldots 208_n$ (collectively "208"), or between a user at one of user terminals 206 and entities associated with one or more of servers 208. For ease of illustration, the configuration and operation of system 200 will be primarily described with respect to transactions between one of user terminals 206 and an entity associated with one or more of servers 208. However, the various embodiments are not limited in this regard and the present technology can be used with any type of transaction.

In operation, the transaction server 204 receives a request for completing a transaction between one of user terminals 206 and one of servers 206. As used herein, the term "transaction" refers to any type of interaction between parties that results in exchange of monies, goods, services, and information. For example, transactions not only include purchases of items by a user, but also encompass providing access to a user to a particular resource, such as an email or other information portal. Further, it should be noted that the transactions discussed herein are not limited solely to electronic exchanges of monies, goods, services, and information. Rather, the present technology is equally useful for monitoring exchanges of physical representations of monies, goods, services, and information.

Upon the transaction server 204 verifying the identity of the user at the requesting one of user terminals 206, the transaction server 204 can be configured to oversee the completion of the transaction by the associated parties. For example, the transaction server can grant access to resources at one of servers 206 or cause one of servers 208 to complete a transaction, such as a transfer of monies and/or goods.

In the various embodiments, the transaction server 204 is shown as being separate from servers 208. However the present technology is not limited in this regard. That is, the transaction server 204 can be incorporated into one or more of servers 208. Further, it is worth noting that the transaction server 204 can be controlled by a same or different entity as that controlling a one of servers 208 associated with the requested transaction. For example, the transaction server 204 can be the payment processing system for an electronic store associated with one or more of servers 208. Alternatively, the transaction server can provide a third party payment processing system configured to operate with the different entities associated with unrelated one of servers 208.

In the present technology, the transaction server 204 not only operates to process and manage transactions between parities, but also operates to provide a notification system for users associated with user terminals 206. In particular, the transaction server 204 can be used to provide notifications to users regarding use of their authentication information. However, unlike conventional systems that rely solely on user information stored in an account profile associated with the user, the present technology relies instead on an analysis of previous transactions associated with the user to determine how to provide notifications to users. This is schematically illustrated with respect to FIG. 3.

FIG. 3 is a schematic illustration of some exemplary concepts for generating notifications in accordance with the present technology. FIG. 3 shows a series of transactions T(i) associated with a user over a period of time. In a conventional system, as previously described, the occurrence of transaction T(n) at a previously unknown device using authentication information associated with a particular user might result in a transaction server accessing a user profile, extracting the contact information from the user profile, and sending a message notifying the user regarding the transaction using the extracted contact information. However, such a methodology ignores previous transactions, which may be a better indicator of how the user should be contacted.

Accordingly, the present technology provides for analyzing the prior transactions associated with the user (i.e., associated with the user's authentication information) and determining the appropriate contact information based on such transactions. In particular, the present technology relies on identifying valid transactions, based on selection criteria, and thereafter using contact information associated with these valid transactions to provide any needed notifications.

The selection criteria for identifying the valid transactions can be configured in a variety of ways. A first exemplary selection criterion is one that considers transactions associated with a specific period of time. For example, as shown in FIG. 3, a time window TW can be specified as being associated with valid transactions. Thus, only transactions occurring within TW (e.g., T(n-1), T(n-2), T(n-3), T(n-4), and T(n-5)) would be considered to be valid transactions. Thereafter, contact information for a notification associated with transaction T(n) would be limited solely to contact information associated with these identified transactions.

It is worth noting that the present technology is not limited to a single time window. Rather, the selection criteria can specify any number of time windows as including valid transactions. The present disclosure also contemplates that time windows can be specified in any number of ways. In one method, a time window can be specified to be a function of the date of the transaction being analyzed. For example, the time window can look at transactions that have occurred within 5 days of the transaction in question. However, any other measure of time can be used. For example, the present disclosure also contemplates that time windows associated with valid transactions can be predefined and fixed.

Additionally, the time windows can also be dependent on the type of transaction. For example, if a particular type of transaction has occurred, it may be more desirable to evaluate similar or related transactions. Further, the time windows can also be dependent on the type of device or any other conditions or characteristics regarding the transaction. Further, the present disclosure also contemplates that one or more of the time windows can be obtained using a combination of different methods. These methods of obtaining time windows solely for exemplary purposes. Thus, the present disclosure contemplate that selection of a time window can be performed based on any type of selection criteria pertinent to the user, the entity, or both.

A second exemplary selection criteria is one that considers transactions associated with a specific device or device type. For example, a device "window" can be specified in which only transactions associated with a particular device are considered valid. Alternatively, if the transaction T(n) occurs using a particular type of device, it may be desirable to evaluate transactions use a same or similar type of device. Thus, the device "window" would only include transactions performed on such devices.

Referring back to FIG. 3, for a device "window" DW associated with a first device D1, only transactions associated with DW (e.g., T(n-1) and T(n-4)) would be considered to be valid transactions. Accordingly, contact information for a notification would be limited solely to contact information associated with these transactions. It is worth noting that the present technology is not limited to a single device for purposes of a device "window". Rather, the selection criteria can specify any number of devices as being associated with valid transactions. Further, the present disclosure contemplates that the device "window" can be associated with particular types or classes of devices or devices having specific characteristics. Such characteristics can specify type of device, the type of communications link for the device, or any other characteristic of interest for a device. Additionally, the present disclosure contemplates that any combination of characteristics can be used to define the device "window". Also, the present disclosure contemplates that different sets of characteristics, regardless of their degree of overlap, can be utilize to define a device "window". However, the present technology is not limited to these exemplary methods and any other methods can be used without limitation.

A third exemplary selection criteria is one that considers transactions associated with a specific location. For example, a location "window" can be specified in which only transactions associated with a particular location are considered valid. Alternatively, if the transaction T(n) occurs at a particular location or type of location, it may be desirable to evaluate transactions use a same or similar type of locations. Thus, the location "window" would only include transactions performed at such locations.

Referring back to FIG. 3, for a location "window" LW associated with a second location L1, only transactions associated with LW (e.g., T(n-3), T(n-4), and T(n-6)) would be considered to be valid transactions. Accordingly, contact information for a notification would be limited solely to contact information associated with these transactions. It is worth noting that the present technology is not limited to a single location for purposes of a location "window". Rather, the selection criteria can specify any number of locations as being associated with valid transactions. Further, the present disclosure contemplates that the location "window" can be associated with particular types of locations or locations having specific characteristics. Additionally, the present disclosure contemplates that any combination of locations can be used to define location "window". However, the present technology is not limited to these exemplary methods and any other methods can be used without limitation.

Although the discussion above has focused primarily on location, time, and device types, the present disclosure contemplates that other type of classifications can also be used to define which transactions are valid and invalid. Other examples of transaction selection criteria include a reviewing a pre-defined number of previous transactions, transaction type, an entity associated with the transaction, a location of the entity associated with the transaction, an amount of the transaction (if monies are exchanged), or any combinations thereof, to name a few. However, the present technology is not limited in this regard.

Further, the present disclosure also contemplates that a combination of such features can be used to identify valid transactions. For example, the valid transactions can be identified on the basis of time, device type, and location, or any sub-combination thereof. Further, valid transactions can also be identified on the basis of any other feature, separately or in combination with any of time, device, and location.

Moreover, the present disclosure also contemplates that the user, an entity associated with the authentication system, or a combination of both, can control the establishment of selection criteria. Thus, a user can potentially create customized selection criteria to provide an additional layer of security for the user's authentication information.

Referring back to FIG. 2, an exemplary arrangement for the transaction server 204 is illustrated. The transaction server 204 can include a communications interface 210 for managing communications with any of user terminals 206 and servers 208. The conventional aspects of the transaction server 204, such as user authentication of requests from user terminals 206 and signaling servers 208 to complete the transaction, can be handled by providing a transaction engine 220. In operation, responsive to a request from one of user terminals 206 to engage in a transaction with one of servers 208, the transaction engine 220 can cause the transaction server 204 to request authentication information from the one of user terminals 206. Thereafter, the transaction engine 220 can consult a user profile database 222 to verify that the authentication information is valid.

If the authentication information is not valid, the transaction engine 220 can deny access to the one of user terminals, request re-entry of the authentication information, request additional authentication information to verify the identity of the user at the one of user terminals, or perform any other actions necessary to ensure only authorized users are permitted to complete a transaction.

In contrast, if the authentication information is valid, the transaction engine 220 permits the requested transaction to be completed. The present disclosure contemplates that the requirements for authenticating a user can vary. Thus, in some configurations, the transaction engine 220 can obtain such requirements from servers 208 or any other location at which these are specified.

As noted above, the present technology relies on previous transactions in order to determine when and how to generate notifications. Accordingly, the present disclosure contemplates that responsive to the user terminals 206 and server 208 engaging in various transactions, a transaction database (DB) 224 can be generated to store information associated with these transactions. The transaction DB 224 can be configured to store various types of information associated with the transaction, the requesting one of user terminals 206, and the associated server 208. For example, a device identifier, a date and time, a location, a requesting device type, language information, or any other information can be stored for each transaction, as noted above. The transaction DB 224 can also be configured to store the contact information associated with the user at the time of the transaction. Alternatively, the transaction DB 224 can include a link or pointed to part or all of the above-identified information. The present disclosure contemplates that in some instances, the transaction DB 224 can also be configured to store information associated with both successful and unsuccessful attempts at completing a transaction. In one exemplary configuration, the transaction engine 220 can be utilized to populate the transaction DB 224. However, the present technology is not limited in this regard. That is, the transaction DB 224 can be stored elsewhere, such as at one of server 208 or at another location.

For purposes of generating notifications, the transaction server 204 of FIG. 2 provides, in one exemplary configuration, a transaction analysis module 226, a notification module 228, and a message DB 230.

The transaction analysis module 226 can be configured for determining if a notification needs to be generated and how the notification should be generated. That is, responsive to a transaction engine 220 managing a requested transaction between one of user terminals 206 and one of servers 208, the transaction analysis module 226 can determine whether a notification is needed and begin the process of identifying valid transactions for purposes of generating the notification.

As noted above, the process begins with the transaction analysis module 226 determining whether or not a notification is needed. The transaction module 226 can be prompted to begin this process in several ways. For example, in some configurations the transaction engine 220 can communicate directly with the transaction analysis module 226, upon receipt of a request user, to begin its analysis. In other configurations, the transaction analysis module 226 can be configured to monitor transactions being managed by the transaction engine 220 and take action independently as requests are received.

The transaction analysis module 226 determines whether or not a notification is required based on device identifier information associated with the authentication information being provided to the transaction engine 220. For example, the transaction analysis module 226 can compare device identifier information associated with a requesting one or user terminal 206 to a list of device identifiers previously associated with the user (i.e., associated with the authentication information). For example, the transaction analysis module 220 can access a user profile stored in the user profile DB 220 to determine whether the device identifier associated with the current transaction is associated with the user. However, the present technology is not limited in this regard and the list of device identifiers can be stored elsewhere.

The present disclosure contemplates that the device identifier information utilized in the present technology contains at least one portion is that is generated via processes that guarantee device identifiers that are unique or practically unique. For example, the device identifier information can include a portion generated using methods for assembling a universally unique identifier (UUID), a globally unique identifier (GUID), or any variants thereof. In some configuration, the device identifiers can be those explicitly associated with the device. That is, a UUID or GUID may be pre-assigned to the device and transmitted by the device as part of a request. However, the present disclosure also contemplates that it may desirable, for privacy concerns to prevent storage of the actual UUID or GUID of the device. Accordingly, in some configurations, the UUID or GUID used can assigned to each user terminals 206 by the transaction server 204, an entity associated with servers 208, or a third party system.

The present disclosure recognizes that in the methods described herein can result in the collection of transaction data that may contain personal data. The present disclosure contemplates that the entities responsible for the collection, analysis, disclosure, transfer, storage, or other use of UUID data and other transaction data should implement and consistently use privacy policies and practices that are generally recognized as meeting or exceeding industry or governmental requirements for maintaining personal information data private and secure.

For example, transaction data should be collected for legitimate and reasonable uses of the entity and not shared or sold outside of those legitimate uses. Further, such collection should occur only after the informed consent of the users. Additionally, such entities would take any needed steps for safeguarding and securing access to such transaction information data and ensuring that others with access to the transaction data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of one or more portions of transaction data during registration for services. In another example, users can select not to provide location information. The present disclosure also contemplates that other methods or technologies may exist for blocking access to their personal information data.

Referring back to FIG. 2, if the transaction analysis module 226 finds a matching device identifier already associated with the authentication information, no further analysis is needed as the request is coming from a trusted or valid device. However, in the case that no such match is found, the transaction analysis module 226 can then begin the process of causing a notification to be forwarded to the user associated with the authentication information.

It is worth noting that the present disclosure is primarily directed to a "passive" notification system. That is, a transaction is generally allowed to proceed, even if from an unknown device, and the notification is intended merely to alert the user in order to afford the user the opportunity to act accordingly if the unknown device is fraudulently using his authentication information.

In the present technology, the transaction analysis module 226 is primarily tasked with: (1) determining the correct contact information for the user and (2) determining a proper format and/or content for the message.

With respect to determining the correct contact information, the present disclosure contemplates that one or more previous transactions will be associated with the correct contact information for the user. The determination of correct contact information is necessary since the currently stored information in the user profile database 220, which is typically used in conventional notification systems, may be incorrect, outdated, or the user may not currently have access to the communications means associated with the stored information. Worse yet, the user's account may have been co-opted by a third party and thus the reliability of the information presently stored therein may be questionable for purposes of alerting the user about possible fraudulent activity using his authentication information.

Accordingly, the transaction analysis module 226 is configured for using selection criteria for identifying valid transactions, as discussed above with respect to FIG. 3. In some configurations, the transaction analysis module 204 can be pre-configured with a set of selection criteria and performs its analysis based on these criteria. However, the present disclosure also contemplates that the selection criteria can vary. For example, for different circumstances associated with the transaction, different sets of selection criteria can be used. For example, based on the type of transaction, the one of servers 208 involved, or any conditions, the set of criteria to be used to analyze a requested transaction can vary. Further, the selection criteria can be stored in various locations in system 200. For example, in some configurations, the selection criteria can be stored within the transaction server 204 itself or even within transaction analysis module 226. However, in other configurations, the selection criteria can also be stored at the one of servers 208 associated with the requested transactions or at a third party location. Further, the present disclosure contemplates that a set of selection criteria can be assembled from criteria obtained from a number of different sources. In such configurations, each source can specify which criteria apply under different circumstances.

Once transaction analysis module 226 obtains the necessary selection criteria, the transaction analysis module 226 can proceed with the identification of valid transactions. For example, referring back to FIG. 2, the transaction analysis module can access the transaction DB 224 to retrieve transactions associated with the authentication information and filter out transactions based on the selection criteria. This filtering can be performed as previously described with respect to FIG. 3.

The present disclosure also contemplates that in some instances the transaction analysis module 226 may consider failed attempts at authentication for purposes of identifying valid transactions. That is, if a particular device identifier was previously associated with a large number of failures to authenticate, transactions associated with this device identifier can be excluded from the valid transactions as the usage of this device may be questionable. For example, if half or more of the transactions associated with a particular device identifier result in authentication failures.

After the transaction analysis module 226 identifies valid transactions, these identified transactions are analyzed further to determine contact information. As described above, the present disclosure contemplates that part of the information stored in the transaction DB 224 for a transaction includes an indication of the contact information associated with the user authentication at the time of this previous transaction. This contact information can be explicitly identified in the transaction DB 224. However, the present technology contemplates that the information in the transaction DB 224 can alternatively provide a location elsewhere in system 200 from which to obtain such information.

In many cases, the contact information associated with two or more valid transactions will be the same. However, the present disclosure also contemplates that for various reasons the contact information can vary among the identified valid transactions. In such cases, the transaction analysis module can be configured to incorporate a set of rules for selecting from among different sets of contact information. In one example, the rules can specify a preference to utilize contact information associated with a majority of the identified transactions. In another example, the rules can specify a preference to utilize contact information associated with transactions at particular locations, at particular times, or using particular devices. In still another example, the rules can specify a preference for particular types of communications. Other rules can be specified as well. Further, rules can be global or localized. That is, a same set of rules can be specified at the transaction analysis module 226 for all transactions. Alternatively, a different set of rules can apply, depending on the parties to the transaction, the types of transactions, or any other criteria.

Regardless of the rules being applied, the transaction analysis module 226 selects a set of contact information for the notification. Additionally, as described above, a format for the notification can also be selected by the transaction analysis module 226 based on the identified transactions. The present disclosure recognizes that to some extent, the format for the notification will be dependent on the contact information. For example, a notification sent by text messaging may need to be different to a notification sent by email. However, the present disclosure also contemplates that some additional formatting of the notification can be required for a user.

In one exemplary configuration, the formatting can specify a language needed for the notification. In such configurations, the language can be determined by an analysis of the valid transactions. For example, the language used to conduct the valid transactions can be identified. In the case where more than one language was used to conduct the valid transactions, rules can be specified for selecting from among the various languages. These rules can be specified in manner substantially similar to that described above for selecting between different contact information. In some instances, it is possible that the communications means associated with the contact information may be incompatible with a particular language. Therefore, in some instances, an alternate language can be selected either by the specification of additional rules or the specifying of a default language at the transaction analysis module 226. For example, an alternative language could be selected based on the location of the one of user terminals 206, an associated one of servers 208, or a combination thereof.

Notification module 228 of transaction server 228 can then use the contact information and the formatting identified by the transaction analysis module 226 to generate the notification. In some configurations, the content for the notification can be retrieved from a message database (DB) 230. That is, based on the formatting identified at the transaction analysis module, an appropriate message can be selected from a collection of pre-defined messages. Alternatively, the message DB 230 can simply provide rules for generating messages. Thus, the notification module 226 can access the message DB 230 to determine how to assemble the message based on the information from the transaction analysis module 226. The assembled notification can then be forwarded through communications interface 210 to the appropriate destination.

Although the exemplary configuration is directed to the selection of a language, the present technology is not limited in this regard. Rather, the present disclosure contemplates that other types of formatting can be selected based on the valid transactions.

The configuration illustrated in FIG. 2 is presented solely to describe an exemplary architecture for a system in accordance with the present technology. However, the present technology is not limited in this regard. Rather, the present disclosure contemplates that other architectures are possible for performing the various methods described herein. Further, such architectures may include more or less components than those illustrated in FIG. 3. Additionally, such architectures may also be implemented in a localized or distributed fashion over one or more networks.

The present disclosure now turns to FIG. 4, which illustrates a method 400 for generating notifications in accordance with the present technology. The method begins at step 402 and continues at step 404. At step 404 a request is received for performing a new transaction. For example, a request can be received at transaction server 204 from one of user terminals 206 to engage in a transaction with one of servers 208. The method 400 can then proceed to step 406, where authentication information for the user is received. Step 406 can involve the transaction engine 220 challenging a requesting one of user terminals for authentication information. However, the present disclosure contemplates that the user terminal may prompt the user for the authentication information prior to communicating with the transaction server 204. For example, the user may be utilizing an application at the requesting one of user terminals 206 that automatically prompts the user for authentication information upon startup, when access to one of servers 208 is required, or when a transaction between different entities is required prior to proceed with operation of the application.

Once the authentication information is received at step 406, the transaction server 204 can proceed with completion of the transaction request at step 408. Step 408 can involve the operations of the transaction engine 220 to determine whether the authentication information is valid, as previously described.

Concurrently or following steps 402-408, the transaction server 204 can proceed with ascertaining a device identifier associated with the request at step 410. This can involve the transaction analysis module 226 analyzing information in transaction DB 224, information being provided by the one of user terminals 206 to transaction server 204, or any combination thereof, as previous described. Afterwards, at step 412, the transaction analysis module 226 can compare the device identifier associated with the request to known or trusted device identifier associated with the authentication information. For example, this can involve the transaction analysis module 226 accessing the user profile DB 220 or other source of known device identifiers.

At step 414, if the device identifier is known, the method can proceed to step 416 and resume previous processing. That is, if the device identifier is known, there is no need to generate the notification. However, if the device identifier is unknown at 414, the method can proceed to steps 418 and 420 to generate the necessary notification.

First, at step 418, selection criteria are utilized to identify valid transactions. For example, the transaction analysis module 226 can apply one or more selection criteria against the transactions in transaction DB 224 to identify those associated with the user authentication information and meeting the selection criteria. Thereafter, at step 420, a notification is generated based on these identified known device identifiers. Step 420 can involve identifying, at the transaction analysis module 226, contact information and formatting for the notification, as described above. Step 420 can also involve the notification module 228 assembling the notification, as also described above. Once the notification is generated at step 420, the method can proceed to step 416 and resume previous processing.

The present disclosure contemplates that in some instances a notification can be generated based on previously known devices. That is, if a device has not been utilized with the authentication information for an extended period of time, it is possible that the device is no longer in use by the user, but by a third party. However, the user may still have the device associated with his user profile. Accordingly, if the device identifier does match a known identifier, the method can optionally proceed to step 422. At step 422, a history of transactions associated with the device identifier is retrieved. Thereafter, at step 424, the time of the last transaction is evaluated to determine whether a pre-defined expiry period has elapsed. If the period has elapsed, the device identified is treated as unknown and the method 400 proceeds to step 418 to generate a notification as described above. Otherwise, the method 400 proceeds to step 416 to resume previous processing.

The present disclosure also contemplates that in some circumstances, based on the transaction or transaction type, a notification may not be generated at all. In particular, if the transaction does not include accessing or modifying secure information or the exchange or transfer of funds, the generation of a notification can be aborted. For example, if the authentication information is utilized to download software free of charge, there is no impact to the legitimate user. Thus, in the absence of a negative effect, the need for a notification is reduced. Accordingly, the present technology can be configured to allow certain types of transaction to occur without notification, even though they are performed on unknown device. The present disclosure also contemplates that a user or an entity can specify the types of transactions that would trigger a notification.

As noted above, the present disclosure primarily contemplates that the process of generating notifications provides a "passive" security system. However, the present disclosure contemplates that under certain circumstances additional actions can be carried out to provide an additional layer of security for a user. For example, as notifications are being generated, the transaction server 204 can maintain a log or record of the generated notifications. This log can then be analyzed at the transaction server 204 by comparing the notifications therein to some criteria for identifying fraud. For example, if a large number of notifications occur within a short period of time, ongoing fraud is likely. However, other criteria can also be specified. Once such criteria are met, whatever it may be, the transaction server 204 can act to safeguard the user. For example, the transaction server 204 can cause an additional notification to be sent to the user with stronger or more alarming language than the prior notifications. In another example, the transaction server 204 can notify an entity associated with the notifications and allow the entity to take action. In still another example, the transaction server 204 can simply prevent the user's authentication information to be utilized. Further, a combination of such methods can also be utilized.

The present disclosure additionally contemplates that the device identifiers can be eventually added to any list of known or trusted identifiers for the user. For example, the transaction server 204 can be configured to monitor user behavior with respect to the notifications. For example, the notification can be configured to ask the user to perform certain acts if the transaction is not valid and the transaction server 204 can be configured to receive a notification of such acts. Thus, if the user does not explicitly act upon receipt of one or more notifications, the transaction server 204 can assume the transactions are valid and automatically add them to the user profile. Accordingly, in response to a future transaction from the same device identifier, no notification would be generated.

Other implementations according to these examples include computer-readable media for carrying or having computer-executable instructions or data structures stored thereon. Such computer-readable media can be any available media that can be accessed by a general purpose or special purpose computer. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Communication at various stages of the described system can be performed through a local area network, a token ring network, the Internet, a corporate intranet, 802.11 series wireless signals, fiber-optic network, radio or microwave transmission, etc. Although the underlying communication technology may change, the fundamental principles described herein are still applicable.

The various embodiments described above are provided by way of illustration only and should not be construed as limiting. Those skilled in the art may recognize various modifications and changes that may be made while following the example embodiments and applications illustrated and described herein, and without departing from the true spirit and scope of the present disclosure.

The invention claimed is:

1. A method comprising:
   receiving, from a user device, a request to engage in a transaction using authentication information;
   ascertaining a unique device identifier for the user device;
   comparing the unique device identifier to a set of known device identifiers previously associated with the authentication information; and
   upon a determination that the unique device identifier is not included in the set of known device identifiers previously associated with the authentication information:
      analyzing a history of prior transactions associated with the authentication information;
      creating a list of selected transactions from the history of prior transactions by selecting only those transactions that fall within a specified time window, are associated with a device type of the user device and where made within a predetermined geographic distance of a geographic location of the user device when the request was received; and
      delivering a notification to a user associated with the authentication information wherein contact information and a format used for delivering the notification to the user is based on a previous contact information and a previous format used to deliver at least one transaction on the selected list of transactions.

2. The method of claim 1, wherein the device identifier is at least partially independent of a network identifier associated with the user device.

3. The method of claim 2, wherein the device identifier comprises a universally unique identifier.

4. The method of claim 1, wherein the delivering comprises generating the notification, and wherein the generating further comprises:
   selecting a language from at least one language associated with the at least one transaction based on at least one language selection rule; and
   adapting the notification to deliver a message in the language.

5. The method of claim 1, wherein creating the list of selected transactions further comprises, selecting only those transactions that are associated with a device type of the user device and were made within a predetermined geographic distance of a geographic location of the user device when the request was received.

6. A system comprising:
   one or more computer processors; and
   a memory storing instructions that, when executed by the one or more computer processors, cause the system to:
      receive, from a user device, a request to engage in a transaction using authentication information;
      ascertain a unique device identifier for the user device;
      compare the unique device identifier to a set of known device identifiers previously associated with the authentication information; and
      upon a determination that the unique device identifier is not included in the set of known device identifiers previously associated with the authentication information:
         analyze a history of prior transactions associated with the authentication information;
         create a list of selected transactions from the history of prior transactions by selecting only those transactions that fall within a specified time window, are associated with a device type of the user device and where made within a predetermined geographic distance of a geographic location of the user device when the request was received; and
         deliver a notification to a user associated with the authentication information, wherein contact information and a format used for delivering the notification to the user is based on a previous contact information and a previous format used to deliver at least one transaction on the selected list of transactions.

7. The system of claim 6, wherein the device identifier is at least partially independent of a network identifier associated with the user device.

8. The system of claim 7, wherein the device identifier comprises a universally unique identifier.

9. The system of claim 6, wherein the delivering comprises generating the notification, and wherein the generating further comprises:
   selecting a language from at least one language associated with the at least one transaction based on at least one language selection rule; and
   adapting the notification to deliver a message in the language.

10. The system of claim 6, wherein creating the list of selected transactions further comprises, selecting only those transactions that are associated with a device type of the user device and were made within a predetermined geographic distance of a geographic location of the user device when the request was received.

11. A non-transitory computer-readable medium storing instructions that, when executed by one or more computer processors of a computing device, cause the computing device to:
   receive, from a user device, a request to engage in a transaction using authentication information;
   ascertain a unique device identifier for the user device;
   compare the unique device identifier to a set of known device identifiers previously associated with the authentication information; and upon a determination that the unique device identifier is not included in the set of known device identifiers previously associated with the authentication information:
    analyze a history of prior transactions associated with the authentication information;
    create a list of selected transactions from the history of prior transactions by selecting only those transactions that fall within a specified time window, are associated with a device type of the user device and where made within a predetermined geographic distance of a geographic location of the user device when the request was received; and
    deliver a notification to a user associated with the authentication information, wherein contact information and a format used for delivering the notification to the user is based on a previous contact information and a previous format used to deliver at least one transaction on the selected list of transactions.

12. The non-transitory computer-readable medium of claim 11, wherein the device identifier is at least partially independent of a network identifier associated with the user device.

13. The non-transitory computer-readable medium of claim 12, wherein the device identifier comprises a universally unique identifier.

14. The non-transitory computer-readable medium of claim 11, wherein the delivering comprises generating the notification, and wherein the generating further comprises:
    selecting a language from at least one language associated with the at least one transaction based on at least one language selection rule; and
    adapting the notification to deliver a message in the language.

15. The non-transitory computer-readable medium of claim 11, wherein creating the list of selected transactions further comprises, selecting only those transactions that are associated with a device type of the user device and were made within a predetermined geographic distance of a geographic location of the user device when the request was received.

* * * * *